Figure 1:
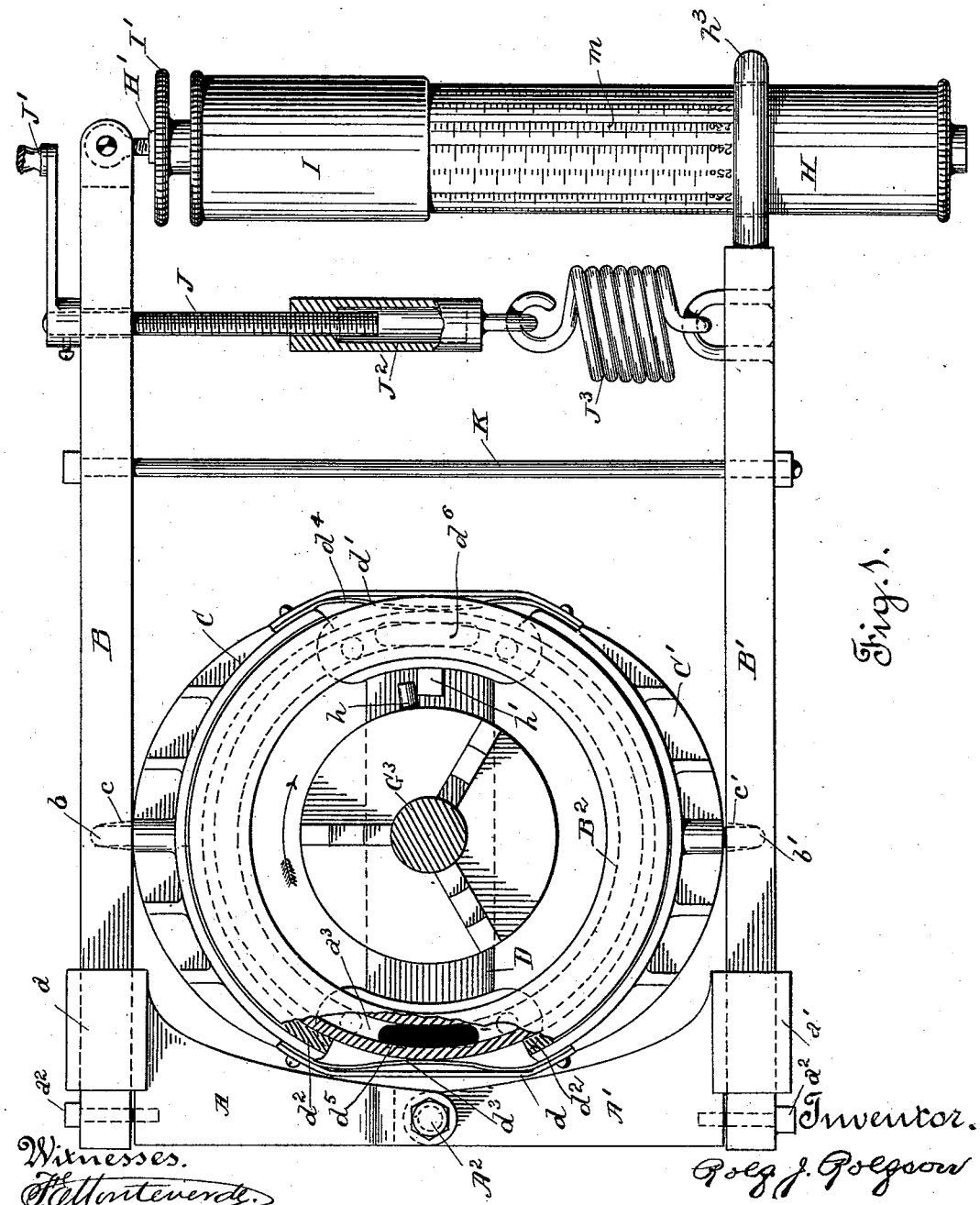

(No Model.) 4 Sheets—Sheet 1.
R. J. ROLFSON.
DYNAMOMETER.

No. 531,006. Patented Dec. 18, 1894.

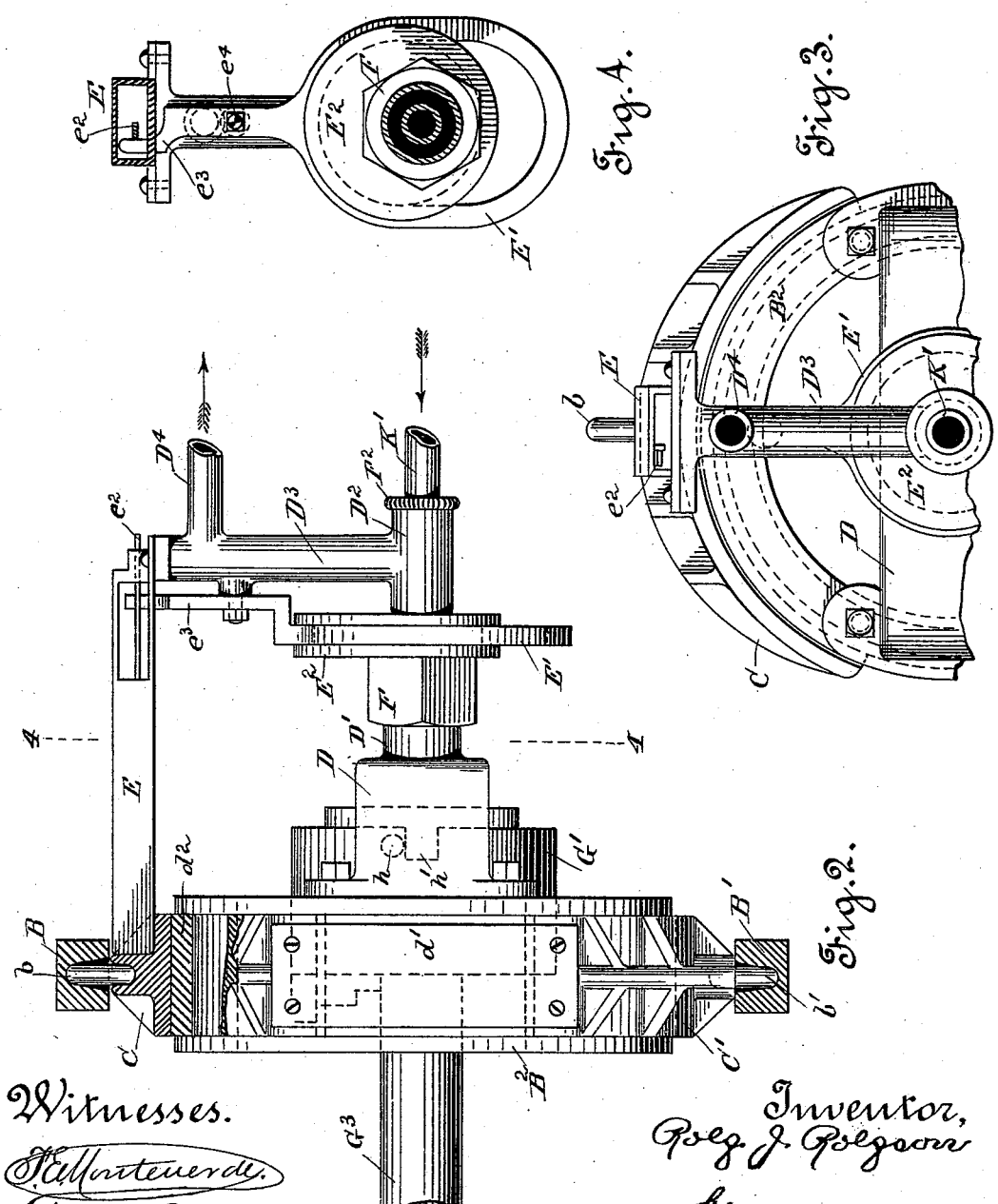

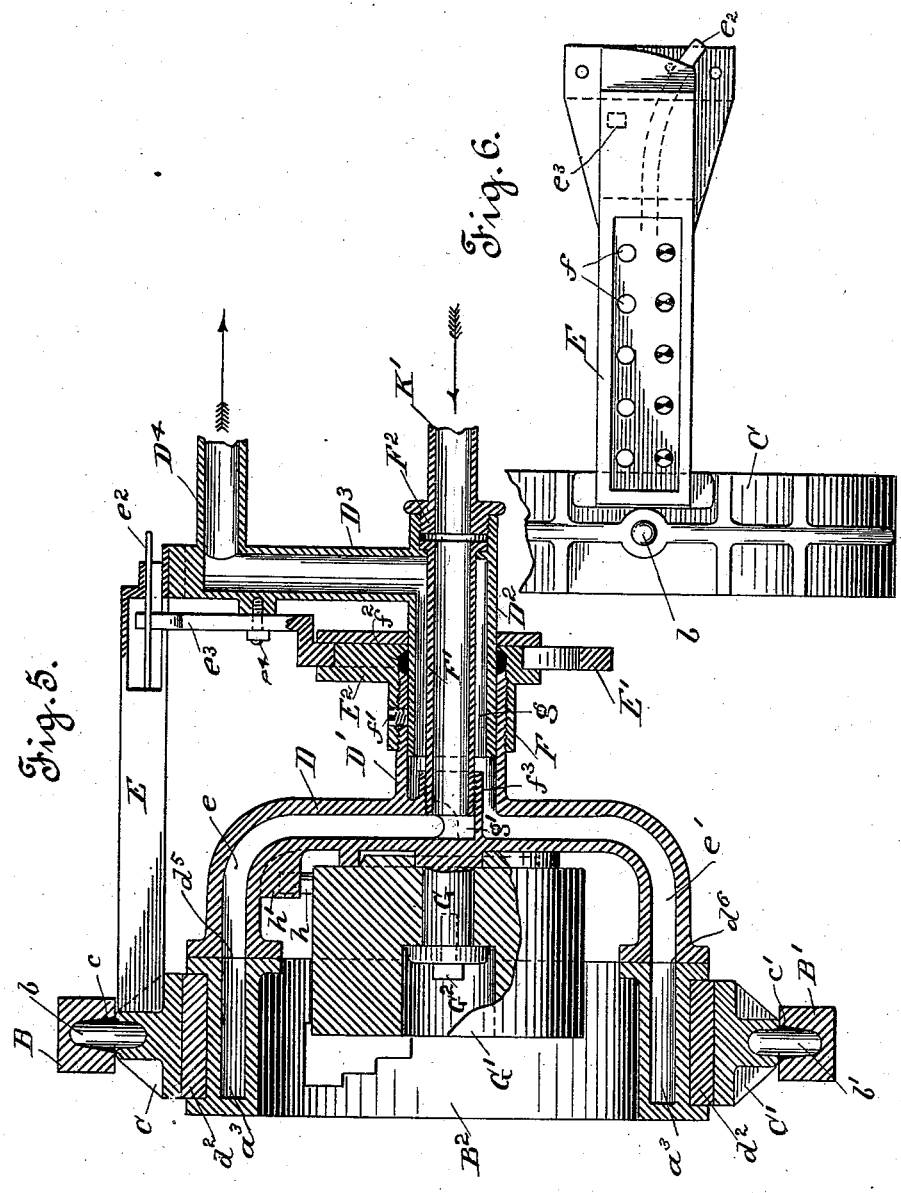

(No Model.) 4 Sheets—Sheet 4.

R. J. ROLFSON.
DYNAMOMETER.

No. 531,006. Patented Dec. 18, 1894.

Witnesses.
H. Monteverde
W. H. Cobb

Inventor.
Roy J. Rolfson
by
N. A. Ricker
atty

UNITED STATES PATENT OFFICE.

ROLF J. ROLFSON, OF SAN FRANCISCO, CALIFORNIA.

DYNAMOMETER.

SPECIFICATION forming part of Letters Patent No. 531,006, dated December 18, 1894.

Application filed October 4, 1893. Serial No. 487,152. (No model.)

*To all whom it may concern:*

Be it known that I, ROLF J. ROLFSON, a citizen of the United States, residing at San Francisco, in the county of San Francisco and State of California, have invented certain new and useful Improvements in Dynamometers; and I do hereby declare the following to be a full, clear, and exact description of said invention, such as will enable others skilled in the art to which it most nearly appertains to make, use, and practice the same.

This invention relates to a certain new and useful dynamometer, designed more particularly for use in measuring the power of dynamos and gas engines, although it may be successfully used to determine the power of any class of machinery with accuracy, and it consists in the arrangement of parts and details of construction, as will be hereinafter more fully set forth in the drawings, described and pointed out in the specification.

The main objects of my invention are to permit the measuring of power whether the revolving shaft be given a right or left hand rotation; to permit the measuring to be made from a horizontal or vertical shaft; and to provide a mechanism whereby the power absorbed by the dynamometer can be determined without the use or aid of complicated calculations.

The invention consists mainly in providing a registering device for the shaft revolutions in connection with a mathematically calculated table for giving correctly the horse-power of the machine, the unit of power being indicated by the number of revolutions which the shaft makes per minute, thus forming the dynamometer with a self-contained tabulated cylinder for the power or resistance offered under a given number of revolutions; mechanism for operating the register; the swinging arms for increasing or decreasing the pressure of the friction brake upon the brake sheave, a compensating device for overcoming wear of the friction brake shoes; and in the mechanism for indicating the horse-power upon the calculated cylinder.

In order to more fully comprehend my invention reference must be had to the accompanying sheets of drawings, wherein—

Figure 8:
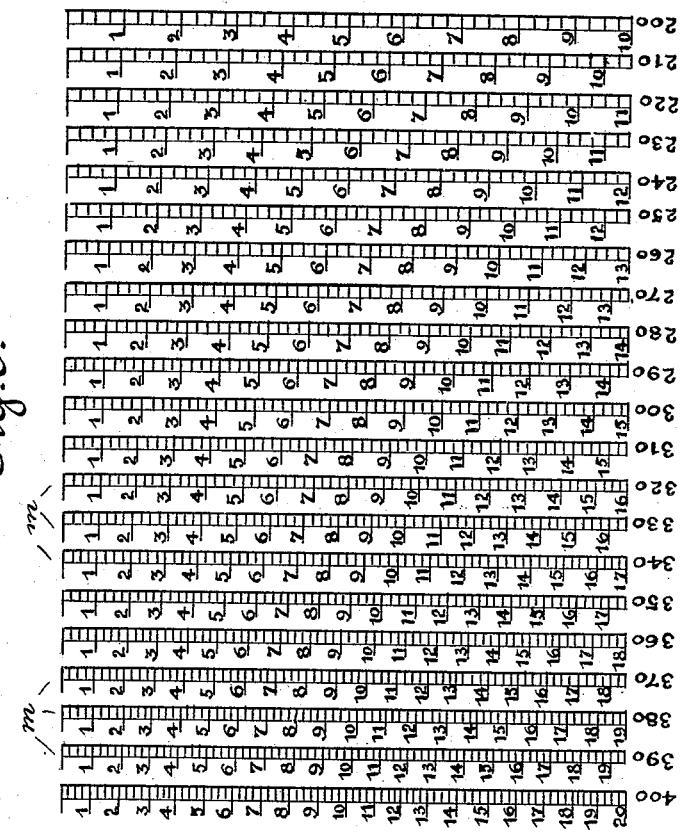
Figure 7:
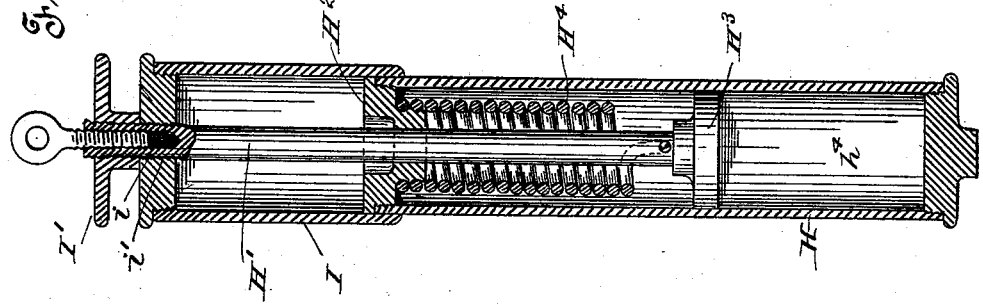

Figure 1, is a side elevation of the dynamometer. Fig. 2, is a vertical end elevation with the upper and lower arms sectioned at the trunnions and the upper brake shoe partly broken; Fig. 3, a broken end elevation of the device shown in Fig. 2, showing more fully the inlet and outlet for the water used in order to maintain the sheave in a cool condition. Fig. 4, is a detail elevation of the eccentric for operating the register, partly in section taken on line 4--4, Fig. 2. Fig. 5, is a vertical sectional end elevation in line with the trunnions, taken when the yoke is in a vertical plane, the chuck and register being shown only in partial section. Fig. 6, is a top plan of the register showing its connection with the upper brake shoe. Fig. 7, is a vertical sectional elevation of the cylinder upon which the horse power is indicated; and Fig. 8, is a plan showing the scale of the cylinder developed.

The letters A, A' respectively indicate the upper and the lower section of the back plate, which are connected by the bolt $A^2$, said bolt serving as a hinge for the arms B, B', in controlling the action of the brake shoes.

Through the guide pieces $a, a'$, of these sections extend the arms B, B', said arms being fastened to the sections by screw bolts $a^2$. The arms may thus be said to be swinging ones, and, if so desired, the arms and sections A, A', may be cast integral. These arms run parallel and between the same is secured the rotating sheave $B^3$, which sheave is held by the brake shoes C, C'. The brake shoes have the trunnions $b, b'$, projecting therefrom, which fit within the sockets $c, c'$, cut in the arms B, B', see Figs. 1, 2, and 5, so as to permit of the sheave or drum $B^2$ being swung completely around in order to receive a right or left hand rotating shaft of an engine. The sheave or drum $B^2$, is made of brass. This metal is preferred for the reason that it will not rust and because I am enabled to obtain greater friction or pressure therefrom upon the friction brake.

The friction brake is composed of the brake shoes C, C', which are united by the straps or bands $d, d'$. To the under face of the brake shoes I secure the layer of leather $d^2$, which contacts with the periphery of the brass sheave. For the purpose of lubrication I locate between the straps or bands, $d$, $d'$ and the periphery of the sheave the canvas strips $d^3$, $d^4$, which strips always bear against the surface of the sheave. These strips being saturated with oil, or suitable lubricant, it is obvious that the sheave is self lubricating. By forcing the leather against the brass sheave greater friction is secured than by the use of any other material with which I am familiar.

The undue wear of the leather surface of the brake shoe is obviated by constructing the sheave of brass for the reason that brass is one of the materials that does not rust. If rust is permitted to accumulate on the periphery of the sheave, and it will if the sheave is constructed of iron, the leather lining of the brake shoes will quickly wear away.

The sheave is made hollow in order to form a water passage way $a^3$, which passage way is intersected by openings $d^5$, $d^6$. To the sheave is fastened the hollow yoke D, the open end of which fits over the openings $d^5$, $d^6$, of the sheave, thus making the passage ways $e$, $e'$, of the yoke D, continuations of passage way $a^3$. This yoke is provided with the hollow sleeve D', which extends therefrom and fits over the end of a pipe $D^2$, as shown. From said pipe, near the outer end thereof, extends the branch pipe $D^3$, from which projects the elbow $D^4$. Connection is made between the pipe $D^3$, and the upper brake shoe by means of the machine register E, which, being of the usual construction, calls for no specific description herein, the register being operated by the reciprocation of the lever $e^2$. This lever is thrown back and forth by the throw of the arm $e^3$, of the eccentric yoke E', which straddles the eccentric $E^2$.

The arm $e^3$, being fulcrumed to the pipe $D^3$, by a pin or bolt $e^4$, it is obvious that the rotation of the eccentric $E^2$ serves to throw said arm to or fro. As the same moves forward it engages with lever $e^2$ and carries the same in a corresponding direction, which rotates the ratchet wheel of the register one tooth and exposes the numeral of the dial, indicative of the number of revolutions made, through one of the openings $f$. From the eccentric projects the hub F, which fits over the sleeve D', and is secured thereto by means of the pin $f'$. See Fig. 5. In order that leakage may not take place between the eccentric and pipe $D^2$, I secure between the two a packing ring $f^2$. Within the pipe $D^2$, runs the pipe F', which is of considerably less diameter, so as to leave an annular space therearound, one end of which is secured into the hollow seat $f^3$, of the yoke, while the opposite end is located within the stuffing box $F^2$, to which the water supply pipe $F^3$ connects. The passage-way $e'$, of the yoke communicates with the annular space $g$, it being separated from the passage-way $e$, at this point by wall $g'$. It will be noticed that pipe $D^2$, is a stationary one, while pipe F', rotates with the yoke D.

From the inner face of the yoke projects the boss G, over which fits chuck G', of ordinary structure, which is tightly held in place by the screw bolt $G^2$, as shown. Within this chuck is secured and held the end of the shaft $G^3$, which extends from the engine. Rotary motion of the engine shaft is imparted, through the medium of the chuck, to the yoke and sheave, and the number of revolutions per minute of said shaft is transmitted to the machine register by means of the eccentric mechanism before described. From the chuck projects the pin or lug $h$, which, as the chuck rotates, engages with the shoulder $h'$, of the yoke and causes the latter to be rotated therewith.

It will thus be seen that the chuck has virtually one complete revolution of back movement. This is very important for the reason that if an engine, especially one run by gas, is suddenly stopped there takes place what is known as a "back kick," and, unless this be allowed for, the indicator of the horse power will be thrown backward likewise and an accurate measurement will not be secured.

In the present instance I have shown the shaft secured within the chuck as a right hand rotating one, but it is only necessary to measure a left hand rotating one, that the swiveled portion of my machine be thrown or swung around, so as to permit of the chuck facing in an opposite direction. The reason for this will be more fully described hereinafter.

The power of the engine is indicated, mechanically, by the cylinder H, which slides loosely through the ring $h^3$, projecting from the outer end of arm B'. The lower end of this cylinder rests upon a solid support, for instance, the floor, and said cylinder is connected to the outer end of the arm B, by the piston H'. See Fig. 1. This piston extends into the cylinder through the cover $H^2$, working within the chamber $h^4$, which is filled with oil. The diameter of the piston head $H^3$ is less than the diameter of the oil chamber. Consequently as the piston is moved downward the oil under the piston head will be forced upward through the annular opening formed between the piston head and the wall of the oil chamber. While the motion of the piston is thus retarded in time, it is not on this account limited as to the length of its stroke. The stroke of the piston depends upon the length of the oil chamber, by which is meant it may be moved the full distance of said chamber. Usually the maximum stroke of the piston is four and three-eighths of an inch, the full stroke carrying the piston head to the bottom of the oil chamber. The time required by the piston to descend when a given force is acting on it depends on the intensity of the force, the clearance between the piston head and the wall of the oil chamber and to a great extent on the nature of the oil in the chamber. As the piston is driven upward to its original position the atmospheric pressure will force the oil contained above the piston head below the same, but the motion of the piston must take place at the same retarded rate which it had going downward. To the piston, above the piston head $H^3$, is secured the lower end of helical spring $H^4$, which surrounds the piston, the upper end being secured to the under face of the cover $H^2$.

The friction generated by the rotation of the sheave $B^2$, and which is equivalent to the work done or capacity of the engine, is measured by this spring $H^4$. As the sheave rotates the friction tends to carry the brake shoes C, C', and the arms connected therewith, around, but this is prevented by the piston H', connected to the arm B, and the cylinder H, the lower end of which cylinder rests on a solid support. This force, however, will drive the piston downward and elongate the spring $H^4$. The force being proportional to the elongation is therefore measured by the same. Any irregularity in the force transmitted to the spring is eliminated by the retarding influence of the oil contained within the oil chamber and through which the piston head moves, the piston being connected to the spring, as shown.

The face of the cylinder is provided with a series of mathematically calculated columns $m$, indicative of the horse power generated by the engine under a given number of revolutions, each column having marked or stamped at the bottom thereof, numerals which indicate the number of revolutions per minute under which the calculated table is made. Each table or column is of the same length and equal to the maximum elongation of the spring $H^4$, which under two hundred pounds pressure is four and three eighths inches. Since the stroke of the piston to which the spring is connected is also four and three eighths inches, it will be seen that the spring is prevented from being overloaded. As will be noticed by the development shown by the cylinder scale, see Fig. 8, the present machine is calculated to register from one to a twenty horse power engine making from two hundred to four hundred revolutions per minute.

The reading of the scale as to the horse power of either column corresponding to the registered number of revolutions is accomplished by means of the sleeve I, which moves vertically upon the cylinder. The cap of this sleeve has a screw-threaded opening $i$, through which the screw threaded end $i'$, of the piston extends. Hence the sleeve may be adjusted so that the lower end thereof will always register with zero of the scale when the machine is not in use. This sleeve is held in place by the jamb nut I'.

The friction of the brake shoes upon the brake sheave is increased or decreased by causing the arms to move to or fro. This is accomplished through the medium of the rod J, which extends through the arm B, and has a handle J', secured to its upper end above the arm. The lower portion of the rod is screw-threaded and works within the thimble $J^2$, which is connected to the arm B', by the spring $J^3$, as shown.

As the handle is turned so as to screw the rod J into the thimble $J^2$, the resistance of the spring, as expanded, causes the swinging arms to move toward each other and forces the brake shoes against the periphery of the brake sheave, thus gradually reducing the velocity or speed of its rotation. The arms moving toward each other causes the sleeve I, to move downward upon the tabulated scale of the cylinder. Now suppose, for instance, it is desired to ascertain the horse power generated by an engine where the shaft rotates say two hundred rotations per minute. In this case it is only necessary to bring the arms together until the resistance offered by brake shoes is sufficient to reduce the rotation of the sheave, within which the end of the engine shaft is secured, to two hundred rotations per minute, which will be indicated by the register. As the arms move toward each other the sleeve is moved downward, as before described. Consequently it is only necessary to find the column of the tabulated table having marked at the base thereof two hundred, and by following this column upward until the lower end of the sleeve is reached the horse power generated will be found. Say the sleeve descends, by inward movement of the arms, until the lower end thereof reaches numeral 6, then, if the sheave rotates two hundred rotations per minute, the generated power of the engine will be six horse power. If the sleeve only descends to numeral 3 or 4 then it would indicate that the engine generated only three or four horse power, and so on, the horse power of the engine always being indicated by the numeral pointed out by the lower end of the sleeve in the column corresponding, as its base, with the rotations of the sheave.

The reading of the revolutions of the engine shaft is secured from the register and by simply following the scale upon the cylinder until the figures at the bottom of one of the columns correspond therewith. Then the horse power may readily be ascertained by noting the unit of such column reached by the vertically movable sleeve.

The arms B, B', are prevented from moving apart beyond a certain distance by the rod K. In case any of the connecting parts should break this rod will hold the arms toward each other.

By interposing the spring between the thimble and the arm B', I compensate for the wear upon the friction brake shoes in case the sheave is kept running for a length of time under a given pressure. The retraction of the spring at such a distance from the fulcrumed point of the arms, in case of wear upon the lining of the shoes, will be so slight that no appreciable difference in the indicating sleeve will be apparent. As the sheave is rotated water enters through the pipe K', into pipe F', passes through the passage-way e, of the yoke D, flows into and circulates within the passage-way $a^3$, of the sheave and makes its escape into passage way e', of the yoke D and from thence within the annular space surrounding the water conveying pipe and is then forced upward into the branch pipe $D^3$, and is finally discharged from the elbow $D^4$. The circulating water maintains the rotating sheave in a cool condition.

The machine register being connected to the brake shoe and branch pipe $D^3$, it is obvious that the friction caused by the rotation of the eccentric and sleeve of the yoke is not lost but is transmitted to the swinging arms and serves to add to the downward movement of the cylinder sleeve. Thus it will be seen that all the work consumed by the dynamometer is accounted for. Since the dynamometer must always be connected to the motor, which is to be tested, in such a manner that the force transmitted is counter balanced by the resistance offered by the solid support at the lower end of the cylinder H, this cylinder must evidently be on the right hand side of the motor shaft if it is a right hand rotating one, and for the same reason the cylinder must be on the left hand side if the shaft is turning in the opposite direction. This is accomplished by having the arms B, B, connected to the brake shoes in the manner already described, which permits the arms and with them the cylinder to be swung completely around from right to left.

Having thus described my invention, what I claim as new, and desire to secure protection in by Letters Patent, is—

1. In a dynamometer, the combination with the rotatable sheave, the chuck located therein, the friction brake for engaging with the sheave, the register for indicating the number of rotations, mechanism for transmitting the rotation of the sheave to the register, the swinging arms, the cylinder having a tabulated scale thereon, a device for indicating the generated power of the engine upon the scale, and of mechanism for moving the swinging arms toward or from each other in order to increase or decrease the pressure of the friction brake upon the sheave.

2. In a dynamometer, the combination with the rotatable sheave, the chuck secured therein for receiving the end of the machine shaft, devices for transmitting the rotations of the sheave to a register, of a cylinder containing a tabulated scale representative of power, and of a device for indicating the generated power of the engine upon the scale by the resistance offered to the rotation of the sheave.

3. In a dynamometer, the combination with the rotatable sheave, the brake shoes, said shoes having a rubbing surface of leather, the straps or bands connecting the shoes, the absorbent material located between the band and periphery of the sheave for supplying lubricant thereto, and of mechanism for moving the brake shoes toward or from each other in order to increase the frictional pressure thereof.

4. In a dynamometer, the combination with the rotatable sheave, the yoke, the chuck connected thereto, the sleeve projecting from the yoke, the machine register for indicating the revolutions of the shaft carried by the chuck, the lever projecting from the register, the eccentric yoke for reciprocating said lever, and the eccentric secured to the yoke sleeve and rotated thereby for imparting a reciprocating movement to the arm of the eccentric yoke.

5. In a dynamometer, the combination with the movable arms, the cylinder having a tabulated scale indicative of power thereon, the oil chamber, the piston working therein, the sleeve working upon the cylinder, and a device for moving the arms to or from each other, said arms when moved toward each other causing the sleeve to move downward upon the tabulated scale of the cylinder so as to indicate the power generated under a given number of rotations.

6. In a dynamometer, the combination with the rotatable sheave, the water passage-way therein, the hollow yoke having an inlet and an outlet passage-way for the water to and from the sheave, the pipe for carrying off the utilized water said pipe connected to the hollow sleeve projecting from the hollow yoke and the water supply pipe for supplying water to the yoke and sheave, said pipe extending through the outlet pipe and sleeve and having its inner end secured to the yoke.

In testimony whereof I affix my signature in presence of two witnesses.

ROLF J. ROLFSON.

Witnesses:
N. A. ACKER,
M. G. LOEFLER.